(12) United States Patent
Quirk

(10) Patent No.: US 11,654,537 B2
(45) Date of Patent: May 23, 2023

(54) TRACK BAR ASSEMBLY AND METHOD OF USE FOR CORRECTING THROWN TRACKS

(71) Applicant: Cody Quirk, Hamilton, GA (US)

(72) Inventor: Cody Quirk, Hamilton, GA (US)

( * ) Notice: Subject to any disclaimer, the term of this patent is extended or adjusted under 35 U.S.C. 154(b) by 465 days.

(21) Appl. No.: 16/420,975

(22) Filed: May 23, 2019

(65) Prior Publication Data

US 2019/0359271 A1 Nov. 28, 2019

Related U.S. Application Data

(60) Provisional application No. 62/675,201, filed on May 23, 2018.

(51) Int. Cl.
*B25B 27/22* (2006.01)
*B62D 55/32* (2006.01)

(52) U.S. Cl.
CPC .............. *B25B 27/22* (2013.01); *B62D 55/32* (2013.01)

(58) Field of Classification Search
CPC ................................. B62D 55/32; B25B 27/22
See application file for complete search history.

(56) References Cited

U.S. PATENT DOCUMENTS

| 3,472,022 | A | | 10/1969 | Leffingwell et al. |
| 3,661,539 | A | | 5/1972 | Eastman |
| 4,283,828 | A | * | 8/1981 | Cole, Sr. ................. B25B 27/22 |
| | | | | 254/100 |
| 5,870,812 | A | | 2/1999 | Abdel-Azeem |
| 6,530,626 | B1 | | 3/2003 | Benoit et al. |
| 2001/0052594 | A1 | * | 12/2001 | Eloy ...................... B62D 55/32 |
| | | | | 254/422 |
| 2012/0042491 | A1 | | 2/2012 | Ramsey et al. |
| 2013/0239405 | A1 | | 9/2013 | Griffith et al. |
| 2015/0375816 | A1 | * | 12/2015 | Ramaiyan .............. B62D 55/32 |
| | | | | 29/283 |
| 2016/0194040 | A1 | | 7/2016 | Bair |
| 2016/0214665 | A1 | | 7/2016 | Campbell et al. |

(Continued)

FOREIGN PATENT DOCUMENTS

KR 20100034069 A * 4/2010 ............. B62D 55/32

OTHER PUBLICATIONS

"Track Bar Systems" (Southern Eco Mulching) available at https://www.youtube.com/watch?v=jaNTVnd7CHw; Oct. 30, 2018; 1 page.

(Continued)

*Primary Examiner* — Jason R Bellinger
*Assistant Examiner* — Emily G. Castonguay
(74) *Attorney, Agent, or Firm* — Smith, Gambrell & Russell; Matthew P. Warenzak

(57) ABSTRACT

A system and method of use of the system to reset a thrown continuous track onto wheels of a continuous track vehicle (CTV). The system includes at least one track bar assembly configured to engage the thrown continuous track to reset teeth within channels on the wheels. In an aspect, the track bar assembly includes a bar configured to engage the inside surface of the thrown track and wheels of the CTV and a track mount tab connected to the bar, the track mount tab configured to engage the outer surface of the continuous track by being received within the gaps between the adjacent treads or over adjacent treads.

15 Claims, 11 Drawing Sheets

(56) References Cited

U.S. PATENT DOCUMENTS

2019/0031258 A1    1/2019  Soik et al.

OTHER PUBLICATIONS

"277B Track service.wmv" (Favel) available at https://www.youtube.com/watch?v=JIHHvVepkRY; Aug. 2, 2010; 1 page.
International Search Report/Written Opinion released by the U.S. Receiving Office as International Search Authority in the corresponding application, PCT/US2019/033774 dated Aug. 19, 2019; 9 pages.

\* cited by examiner

_US 11,654,537 B2_

TRACK BAR ASSEMBLY AND METHOD OF USE FOR CORRECTING THROWN TRACKS

CLAIM OF PRIORITY

This application claims priority to U.S. Provisional Application No. 62/675,201, filed on May 23, 2018, which is relied upon and incorporated herein in its entirety by reference.

FIELD OF THE INVENTION

The present invention relates to tools used to assist in resetting thrown tracks onto rollers for continuous track vehicles.

BACKGROUND OF THE INVENTION

Continuous track vehicles (CTV) utilize continuous tracks that are driven by driving wheels. Continuous tracks include numerous separate treads attached to one another, with the threads including teeth on their interior side. The teeth engage the driving wheels, as well as stabilizing wheels, of the CTV, in order to move the continuous track forwards, backwards, or both directions when executing a turn.

Continuous tracks allow CTVs to traverse uneven terrain while distributing the weight of the vehicle more evenly across the track as it engages the surface, creating an advantage over normal wheel based vehicles. However, a common problem that CTVs face is throwing a continuous track from the driving wheels. In such instances, the teeth on the treads disengage from the wheels, preventing the continuous track from fully engaging with the wheels to move the CTV along.

The throwing of a track is common place, especially if the CTV is used in remote and ungraded areas. The continuous tracks can dislodge from the driving wheels due to the track going over a hard, uneven surface (e.g., rock, stump, etc.), which causes the track teeth to be pushed out of the driving wheels, either to the machine side or opposite side. The chances of the track being thrown/dislodged increases especially when operating on steeper and rough terrain.

Resetting the continuous track on the driving wheels is an arduous task, especially if the CTV is in a remote area. Users can attempt to reset the track using pry and crow bars. This method requires at least two users, one to apply pressure with the pry bar while the other rotates the track in the necessary direction to get the teeth back into the drive wheel. Such attempts can take hours. Another option is to call a service which can reset the continuous track, which takes time and can be expensive.

Therefore, there is a need for a system and method for resetting thrown continuous tracks on the wheels of CTVs in a quick and efficient manner, while only requiring one person.

SUMMARY OF THE INVENTION

The invention is directed to a track bar tool used to reset a thrown continuous track onto wheels of a continuous track vehicle (CTV). In an aspect, the track bar tool is configured to reset teeth of the continuous track within channels on the wheels. In an aspect, the track bar tool is configured to be received within a gap between adjacent treads or on a tread itself of the thrown continuous track. In an aspect, the track bar tool has components that are large enough to disengage the teeth from the wheels while allowing the track to be advanced along the driving wheels. In an aspect, the track bar tool includes a bar configured to engage the inside surface of the thrown track and wheels of the CTV, and a track mount tab connected to the bar, the track mount tab configured to engage the outer surface of the continuous track. In such aspects, the track mount tab can be configured to be received within gaps of the track, or engage the outer surface of treads. In an aspect, three track bar tools are used, and are configured to be placed in three adjacent gaps or over three adjacent treads of the continuous track. In an aspect, three track bar tools are inserted between teeth along a section of the continuous track. In an aspect, at least one of the three track bar tools further comprises a tab brace connected to the bar and the track mount tab, wherein the tab brace is further configured to receive force to put the continuous track back onto the wheels.

In an aspect, the present invention is directed at a method of resetting a thrown continuous track onto wheels of a continuous track vehicle using a track bar tool. The method includes placing at least one track bar tool on the continuous track, within a gap between treads or on the threads themselves, moving the continuous track so the at least one track bar tool engages one of the driving wheels of the continuous track vehicle so that the teeth of the continuous track do not touch the driving wheels, applying force to the at least one track bar tool to move the continuous track until the teeth of the track are aligned with the channels of the driving wheels, and removing the at least one track bar tool from the track, leaving the teeth within the channels. In an aspect, the method of applying force comprises applying force to the at least one track bar tool to move the continuous track until the teeth of the track are aligned with the channels of a front driving wheel, advancing the continuous track to the back wheel, and applying the force to the at least one track bar tool to move the continuous track until the teeth of the track are aligned with the channels of the back driving wheels.

The benefits of such a system and method are numerous. First, the system and method discussed above can be performed by one person. Second, the track bar tools are portable and easily stored on the CTV. The use of the system greatly reduces the time needed to reset the track, ranging from five to ten minutes using one person. If two people are involved, the time can be reduced even further.

These and other aspects of the invention can be realized from a reading and understanding of the detailed description and drawings.

DETAILED DESCRIPTION OF THE INVENTION

In the following detailed description of the embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention. Mechanical, and structural changes may be made to the embodiments without departing from the spirit and scope of the present teachings. The following detailed description is therefore not to be taken in a limiting sense, and the scope of the present disclosure is defined by the appended claims and their equivalents.

The current invention is directed at a track bar tool and its method of use for resetting thrown continuous tracks on the wheels of a continuous track vehicle (CTV). In an aspect, the track bar tool can be utilized in the field by a single user in order to reset the continuous tracks. The track bar tool is compact, transportable, and easy to use with very little training or additional equipment required.

Figure 20:
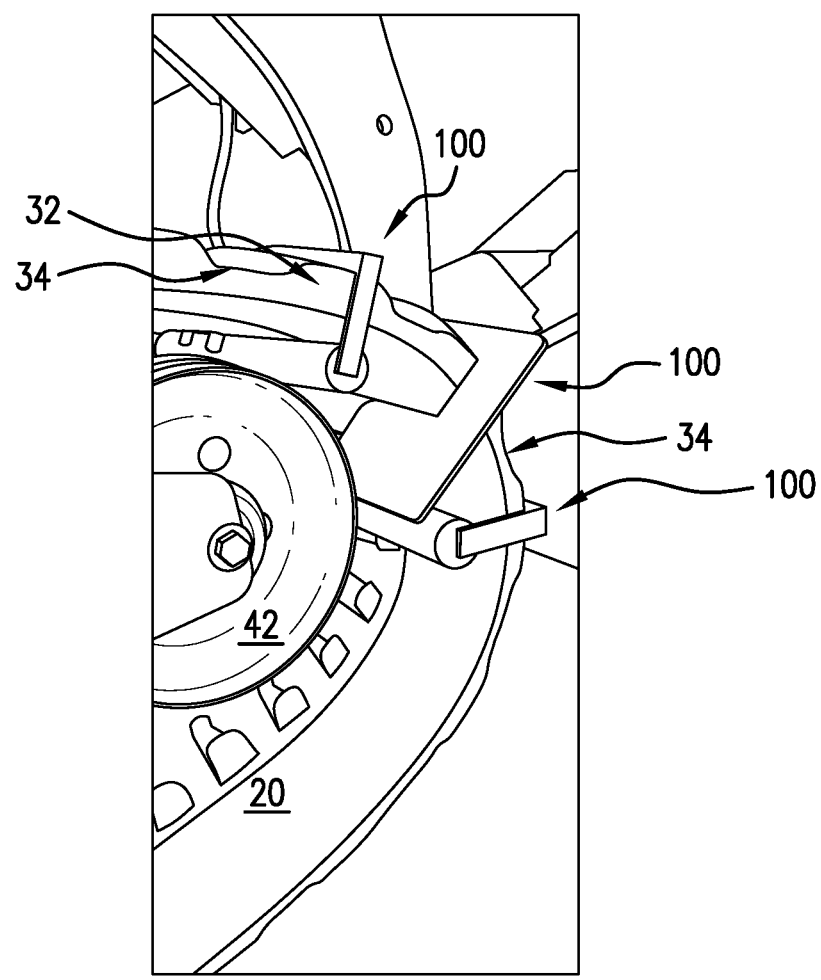
FIG. 20 illustrates a track bar tools placed over adjacent treads.

FIGS. 1-16 and 20 illustrate a track bar tool 100, and its application, according to an aspect of the present invention. The track bar tool 100 is configured to be used with a thrown track 20 of a CTV 10 (see FIGS. 9-16). In a more specific aspect, the track bar tool 100 is configured to be removably engaged with a continuous track 20, engaging the outer surface 22 and the inner surface 24 of the track 20. In an aspect, the track bar tool 100 is configured to fit between the gaps 34 of the treads 32 as well as the teeth 26 of the tracks, as shown in FIGS. 11-16. In an aspect, the track bar tool 100 is configured to fit over adjacent treads 32, as shown in FIG. 20. Once placed on the tracks 20, force is applied to the track bar tool 100 to move the track 20 back in line with the roller tool 40 (see FIGS. 12 and 14). The track bar tool 100 engages the roller tool 40 of the CTV 10, disengaging teeth 26 of the treads 32 from the driving wheels 42 of the roller tool 40, so that the teeth 26 can be realigned with internal channels/grooves 44 of the driving wheels 42 (See FIGS. 13 and 15). In one aspect, three track bar tools 100 are utilized with the thrown track 20 in order to completely disengage the teeth 26 of the driving wheels 42, discussed in detail below.

Figure 1:
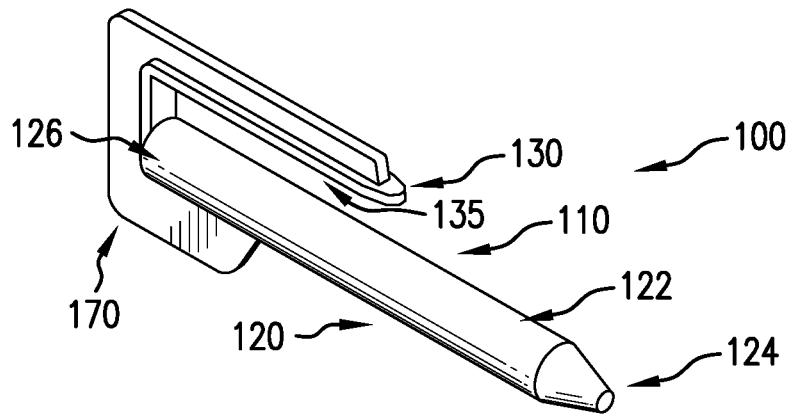
FIGS. 1-3 show various views of a track bar tool according to an aspect of the present invention.
Figure 2:
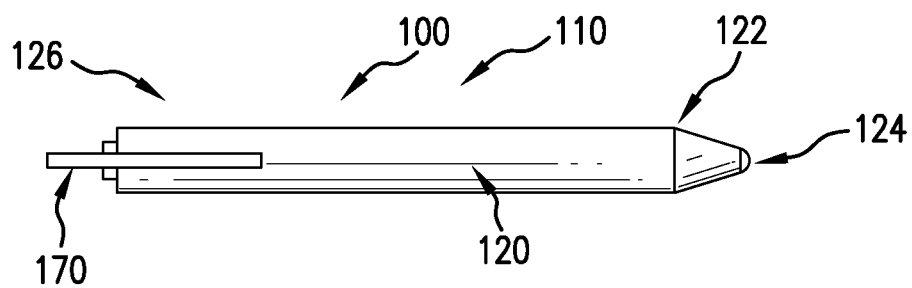
Figure 3:
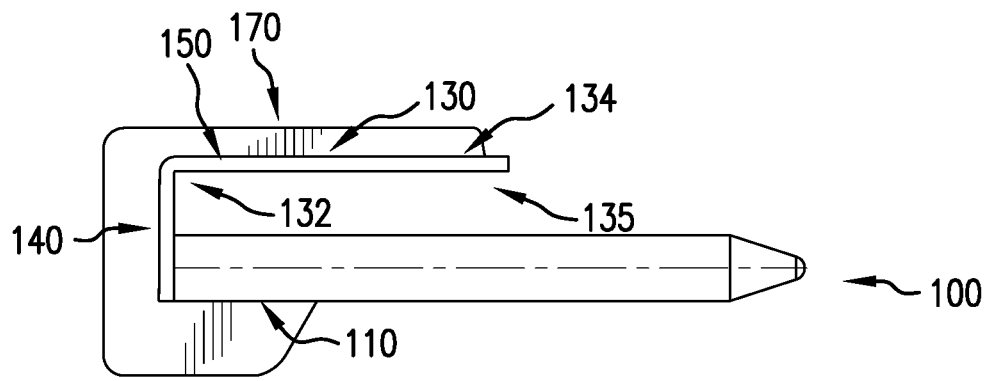
Figure 4:
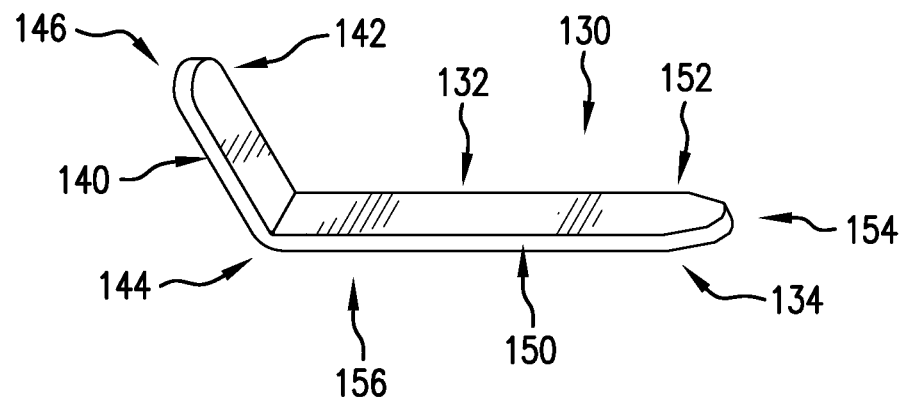
FIGS. 4-5 show various views of a track mount tab of the track bar tool of FIGS. 1-3.

In an aspect, as shown in FIGS. 1-3, the track bar tool 100 includes a bar 110, a track mount tab 130, and a tab brace 170. The bar 110 is configured to engage the inner surface 24 of the continuous track 20 as well as the driving wheels 42 to ensure that the teeth 26 of the tracks 20 do not touch or engage the wheels 42, allowing the teeth 26 and the track 20 to be reset and aligned with the channels 44 of the driving wheels 42. The track mount tab 130, connected to the bar 110, is utilized to keep the track bar tool 100 removably secured to the thrown track 20. The track mount tab 130 engages the outer surface 22 of the track 20 opposite the inner surface 24 of the track 20 where the bar 110 is located. In an exemplary aspect, both bar 110 and track mount tab 130 are configured to be received within the gaps 34 of the treads 32 of the track 20. In another aspect, the track bar tool 100 is configured to fit over adjacent treads 32, as shown in FIG. 20.

In an aspect, the bar 110 includes a long cylindrical body 120, as shown in FIGS. 1-3. In exemplary aspects, the cylindrical body 120 has a diameter that is larger than the height of the teeth 26 of the track 20. This ensures that the bar 110 extends beyond the track teeth 26, pushing on the wheels 42 of the roller tool 40, allowing for later alignment of the teeth 26 with the channels 44. In another aspect, the cylindrical body 120 has a length that allows the body 120 to extend beyond the teeth 26 while engaging the track 20 with the track mount tab 130 abuts the edge of the track 20. In other aspects, the bar 110 can have a different shape, but the round nature of a cylindrical body 120 is preferred as it allows the bar 110 to move along the wheels 42 easily when the track 20 is advanced, whereas a shape with a flat surface could produce unwanted friction.

In an aspect, the cylindrical body 120 is defined by a front end 122 and a back end 126, with the front end 122 configured to be inserted between the inner surface 24 of the track 20, between the teeth 26, and the roller tool 40. In an aspect, the front end 122 can include a conical tip 124, making the insertion of the cylindrical body 120 between the inner surface 24 of the track 20 and the roller tool 40 easier. The back end 126 of the cylindrical body 120 is connected to the track mount tab 130.

The track mount tab 130, as shown in FIGS. 1-7, includes an inner surface 132 and an exterior surface 134, with the inner surface 132 configured to engage the track 20. The exterior surface 134 can engage the tab brace 170. The track mount tab 130 includes a vertical portion 140 and a horizontal portion 150. In an aspect, each of these portions 140, 150 has a rectangular shape, with the width being much shorter than the length, and the thickness of the portions 140, 150 being smaller than the width. In an aspect, the track mount tab 130 is configured to secure the track bar tool 100 to the track 20, with the horizontal portion 150 engaging the outer surface 22 of the track 20, and the vertical portion 140 abutting the edge of the track 20. The track mount tab 130 with the bar 110 forms a receiving gap 135 in which the track 20 is received. In an aspect, the receiving gap 135 can vary depending on the size of the tracks 20 for which it will be used. In some aspects, the receiving gap 135 is large enough to receive the track 20 at gaps 34 for some tracks 20 or treads 32 themselves.

Figure 5:
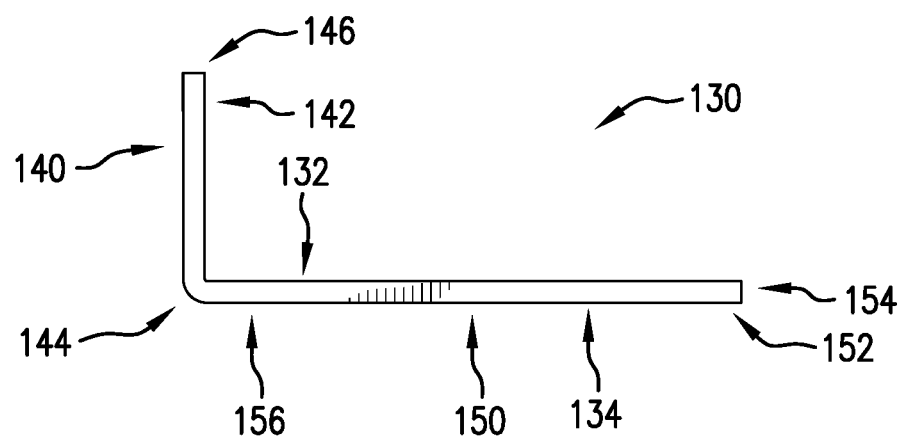

In an aspect, the vertical and horizontal portions 140, 150 of the track mount tab 130 are formed from one continuous piece of material formed into an approximate right angle, as shown in FIG. 5. However, in other embodiments, the vertical and horizontal portions 140, 150 are separate pieces and welded/connected together. In an aspect, the vertical portion 140 includes a bottom end 142 and a top end 144, with the bottom end 142 being attached to the back end 126 of the bar 110. In an exemplary aspect, the bottom end 142 can be further shaped to have a rounded end 146, in order to match the cylindrical shape of the bar 110, making the track bar tool 100 less cumbersome. In an aspect, the horizontal portion 150 has a front end 152 and rear end 156, with the rear end 156 meeting the top end 144 of the vertical portion 140. In an aspect, the front end 152 can be rounded 154, making it easier for the horizontal portion 150 to slide into the gaps 34 between the treads 32 of the track 20.

Figure 6:
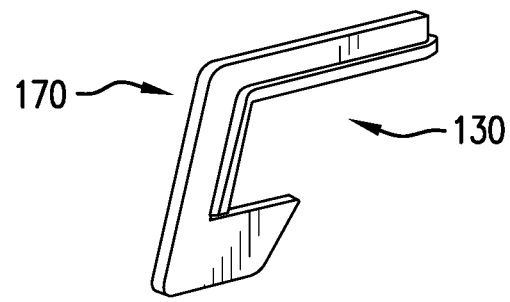
FIGS. 6-7 show various views of a tab brace and track mount tab of the track bar tool of FIGS. 1-3.
Figure 7:
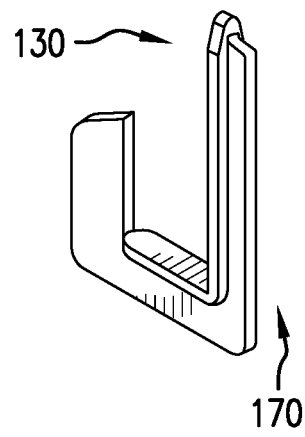
Figure 8:
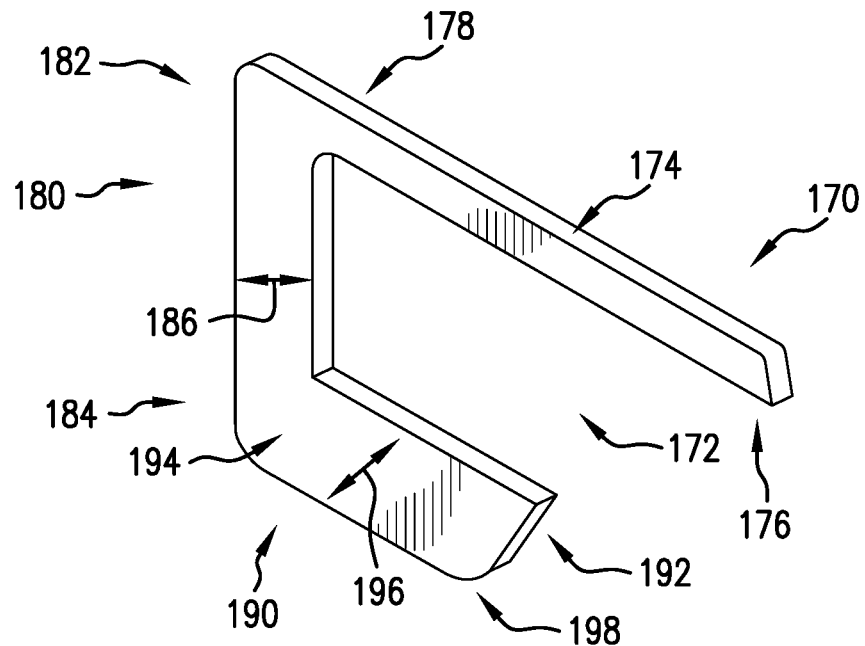
FIG. 8 illustrates a tab brace of FIGS. 6-7.
Figure 9:
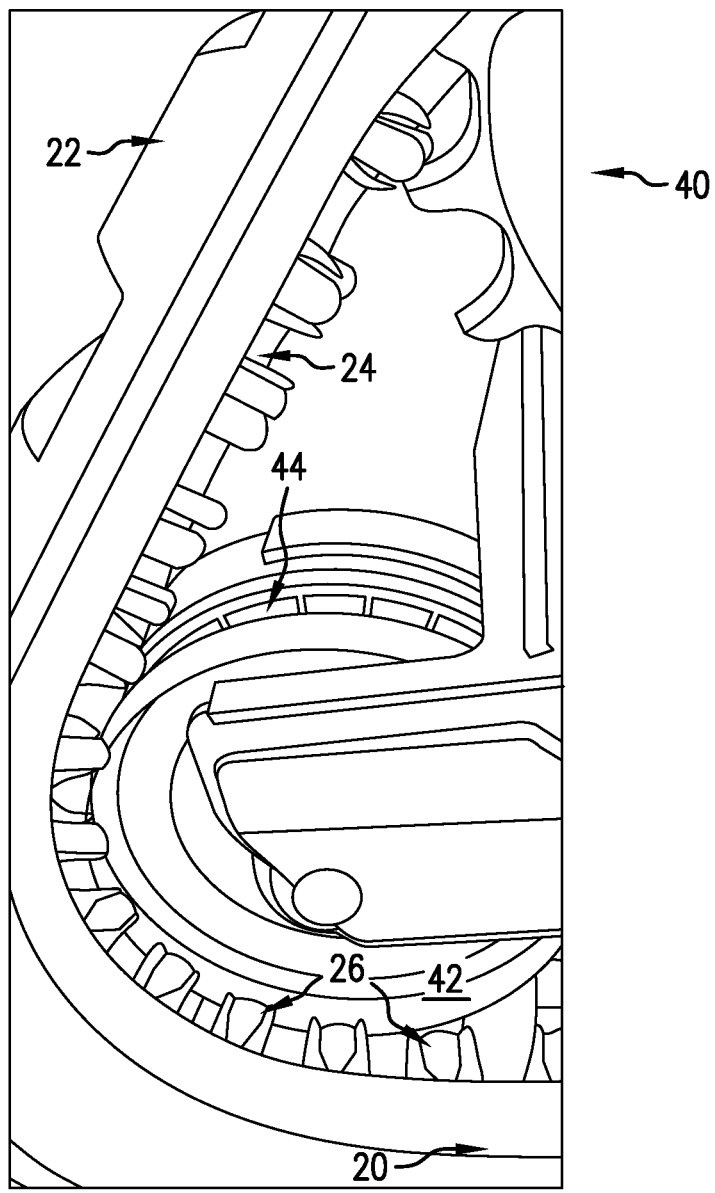
FIG. 9 illustrates a thrown track off the driving wheels of a CTV.
Figure 10:
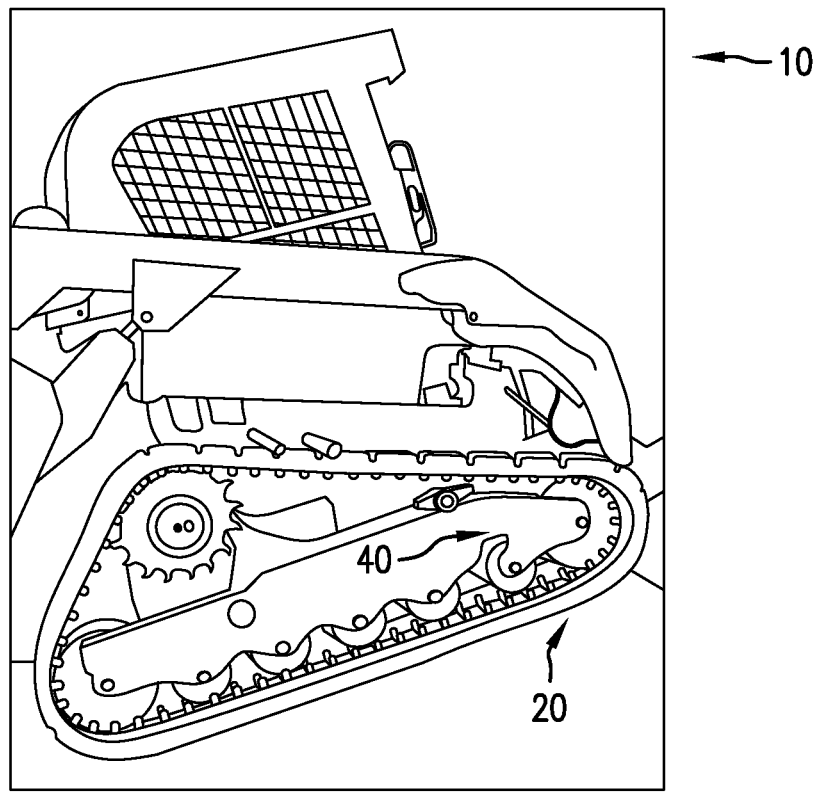
FIG. 10 illustrates a CTV with the track and roller tool prepared for resetting the track.
Figure 11:
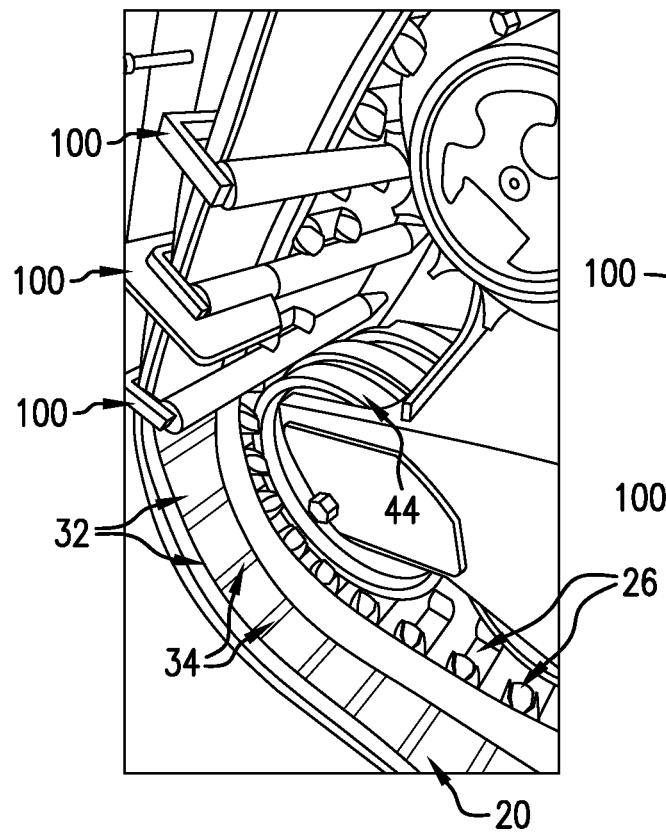
FIG. 11 illustrates a plurality of track bar tools being placed on a track according to an aspect of the present invention.
Figure 12:
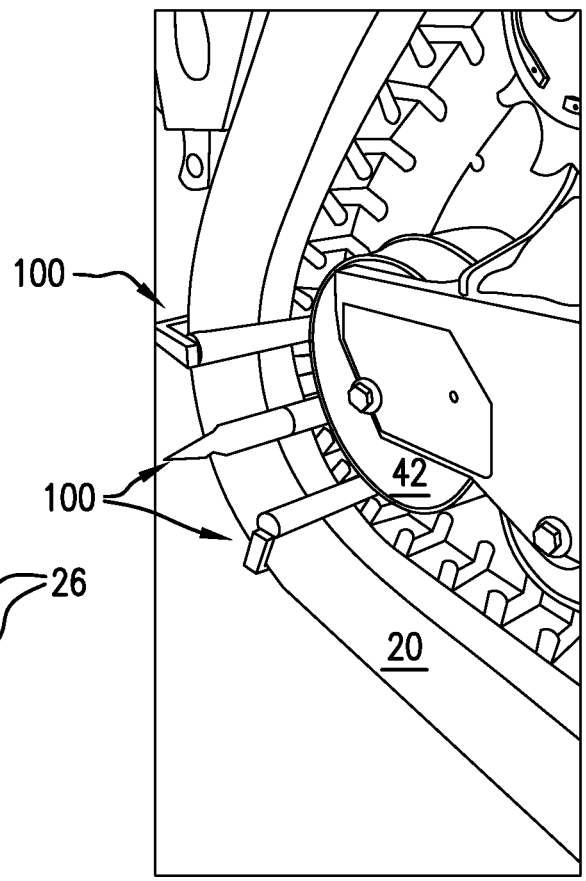
FIGS. 12 and 14 illustrate the track bar tools advanced to engage the driving wheel of a CTV.
Figure 13:
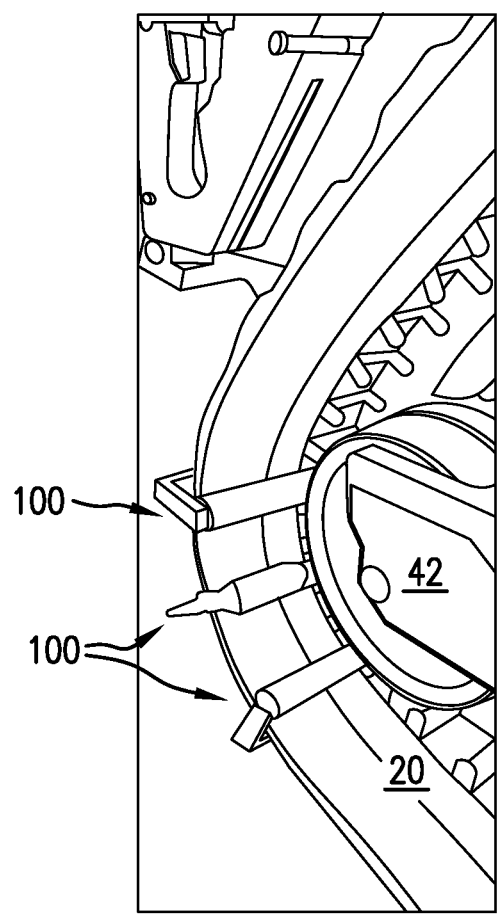
FIGS. 13 and 15 illustrate the track bar tools after force has been applied to engage the driving wheels.
Figure 14:
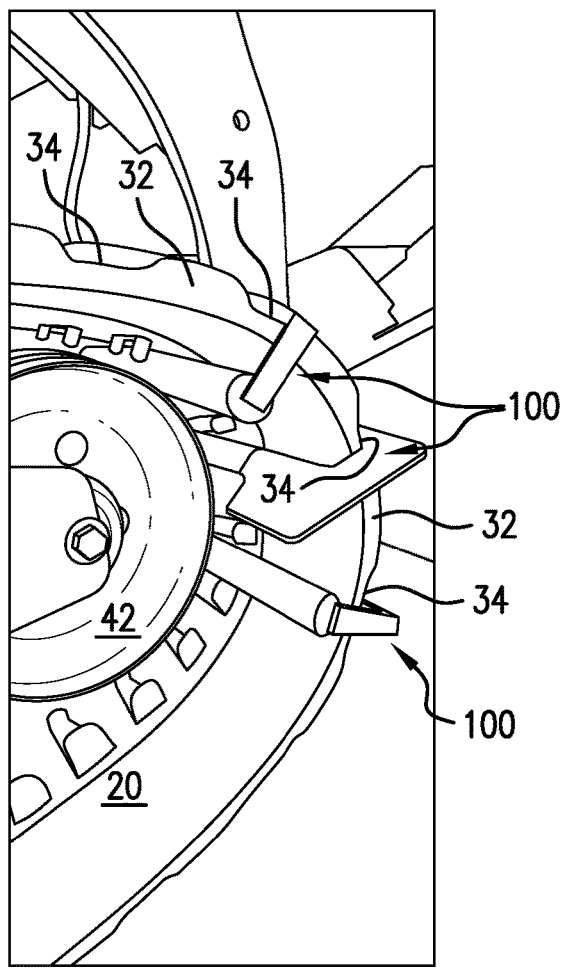
Figure 15:
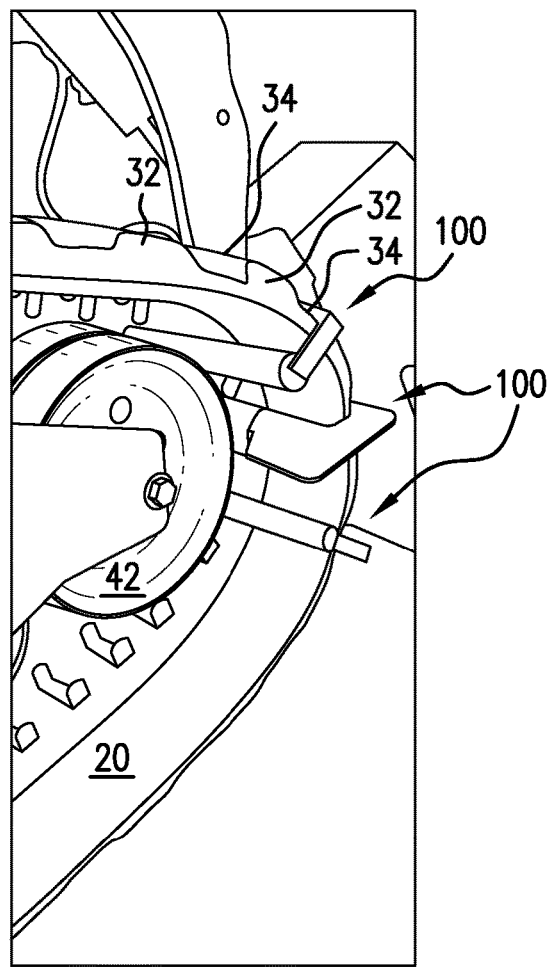
Figure 16:
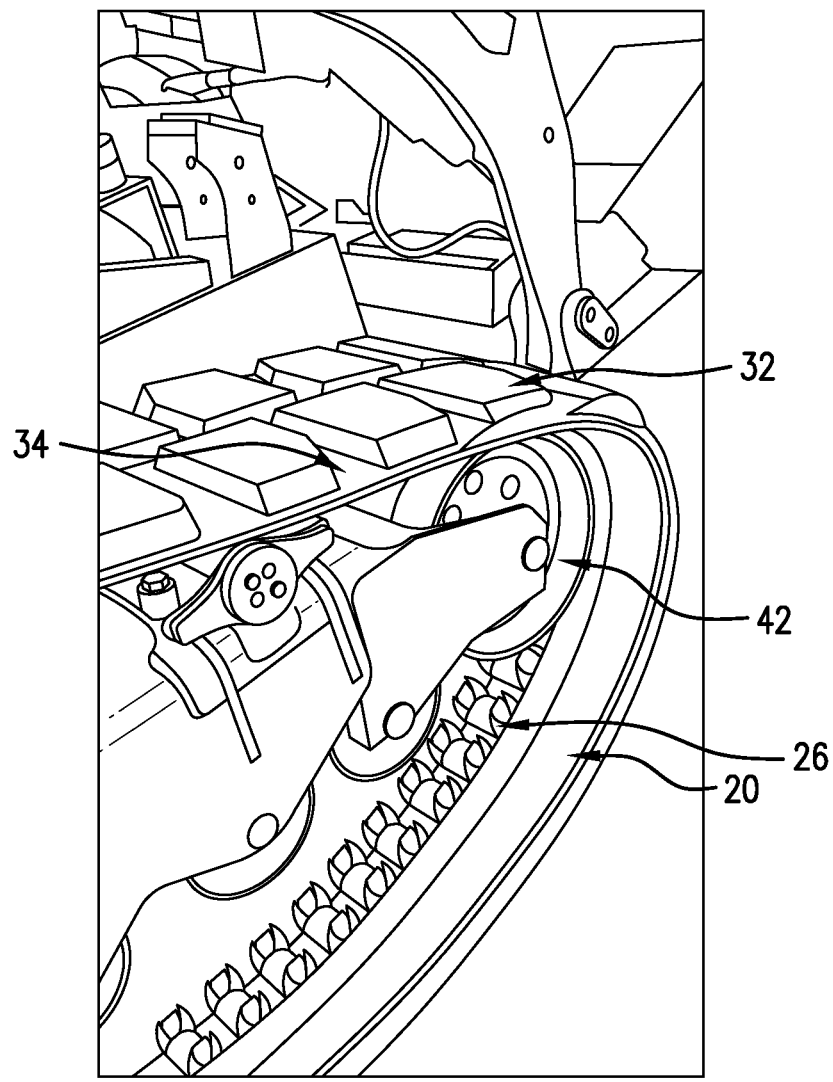
FIG. 16 illustrates the track back on the driving wheels with the track bar tools removed.

In an aspect, the track bar tool 100 includes a tab brace 170 to reinforce the track mount tab 130, as shown in FIGS. 6-8. As discussed above, force is applied to a track bar tool 100 to move the thrown track 20 back onto driving wheels 42 of the roller tool 40. The tab brace 170 provides support for the track bar tool 100 to receive such force.

The tab brace 170 includes a notch 172, which receives the bar 110 and track mount tab 130. The tab brace 170 can be made of one single piece of material, forming a long horizontal tab 174, a vertical portion 180, and a wide horizontal tab 190. The long horizontal tab 174 is configured to be joined/welded to the horizontal portion 150 of the track mount tab 130. In an aspect, the long horizontal tab 174 is approximately the same length of the horizontal portion 150 of the track mount tab 130. In an aspect, the long horizontal tab 174 of the tab brace 170 is oriented in a perpendicular fashion with the horizontal portion 150 of the track mount tab 130, providing more support for the track bar tool 130. The long horizontal tab 174 includes a front end 176 and a back end 178.

The back end 178 of the long horizontal tab 172 runs into the vertical portion 180, which includes a top end 182 and a bottom end 184, with the top end 182 meeting the back end 178 of the long horizontal tab 174. The vertical portion 180 has a width 186 of such a length to prevent the force-applying object to the track mount tool 100 from hitting the track 20 or roller tool 40. In addition, the vertical portion 180 is welded/connected to the vertical portion 150 of the track mount tab 130. In an aspect, the vertical portion 180 is mounted perpendicular to the vertical portion 150 of the track mount tab 130 for additional support and application of force. The length of the vertical portion 180 also provides a larger target to receive and distribute force for the track bar tool 100 to the track 20. In an aspect, the bar 110 and track tab 130 are attached to the tab brace 170 in a manner which places the bar 110 in a location that is approximate to the center of the vertical portion 180 of the tab brace 170 to ensure that the force applied is applied to the combination of bar 110/track mount tab 130 to move the track 20 as efficiently as possible to a reset position.

The bottom end 184 of the vertical portion 180 of the tab brace 170 extends into the wide horizontal tab 190, and more specifically a back end 194 of the wide horizontal tab 190. The horizontal tab 190 includes a front end 192 and a width 196. In an aspect, the front end 192 has an angled portion 198. The horizontal tab 190 is welded/joined/connected to the outer surface of the cylindrical body 110 of the bar 100. By providing an angled portion 198, the wide horizontal tab 190 provides a significant amount of support to receive and distribute the force while avoiding actual contact with wheels 42 of the roller tool 40 when the track 20 is being reset.

In other embodiments, the tab brace 170 of the track bar tool 100 can have various components and sizes, but is configured to distribute the force to the tool 100 safely and efficiently. For example, in one aspect, the tab brace 170 can include a component that provides a large surface to receive the force that is applied. The component can be circular or polygonal in nature.

Further, as discussed above, in an aspect, more than one track bar tool 100 can be utilized at a time to reposition the track 20. For example, as shown in FIGS. 11-15, three track bar tools 100 can be utilized. While all track bar tools 100 can include a tab brace 170, it is not necessary as force only needs to be applied to one track bar tool 100 in order to move the track 20 back on the driving wheels 42.

Figure 17:
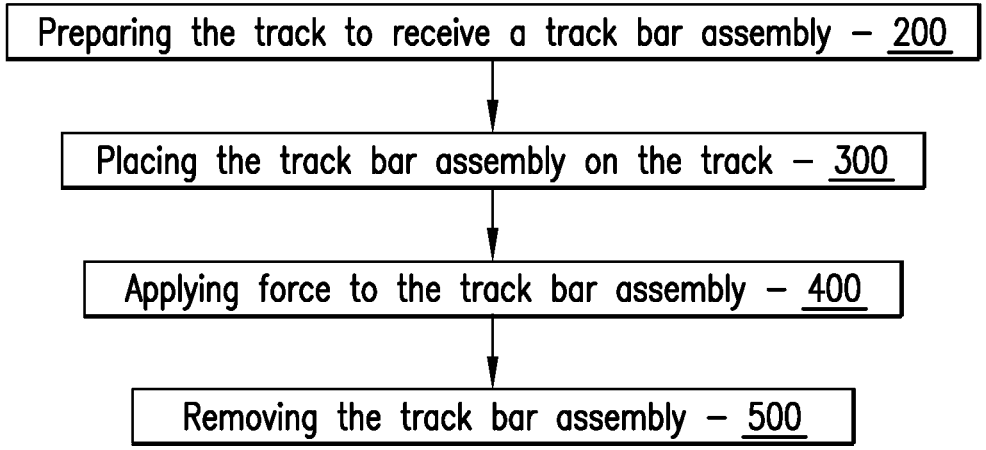
FIGS. 17-19 illustrate methods of using the track bar tool according to an aspect of the present invention.

The track bar tools 100 are used to reset a continuous track 20 onto the roller tool 40 of a CTV 10 in the following method according to an aspect, as shown in FIG. 17. The method includes preparing the track 20 to receive the track bar tool (step 200), placing the track bar tools 100 on the track (step 300), applying force to the track bar tools 100 (step 400), and, after the track has been reset, removing the track bar tools (step 500).

Figure 18:
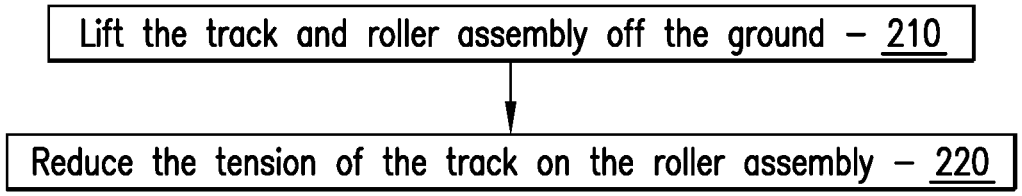

The continuous track 20 of the CTV 10 has to be prepared to receive the track bar tools, shown in step 200 (see FIG. 18). First, the track 20 and the roller tool 40 have to be lifted off the ground (step 210). This can be done in numerous ways, including using blocks and/or ramps on one end and other hydraulic components of the CTV 10 on the other end (e.g., front loader, etc.). Once the track 20/roller tool 40 are off the ground, the tension of the track 20 is released/decreased (step 220).

Figure 19:
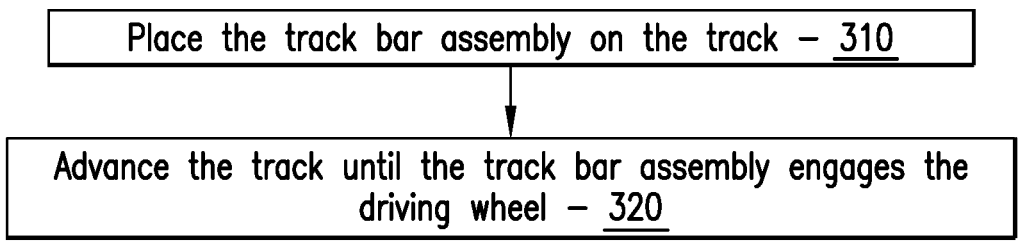

After the track 20 is prepared (step 200), the track bar tools 100 are placed on the track 20 (step 300), as shown in FIG. 19. A first track bar tool 100 is placed along the track 20, with the track bar mount 130 oriented to receive the track 20, with the bar 110 being placed between the roller tool 40 and the track 20 (step 310). In one aspect, the track bar tool 100 is placed in the gaps 34 between the treads 32, as well as the teeth 26, with the front end 120 inserted in between the roller tool 40 and the track 20. In an aspect, the track bar tool 100 is configured to fit over adjacent treads 32 and between the teeth 26. The track bar tool 100 is advanced/mounted onto the track 20 until the track bar mount 130 engages the edge of the track 20, preventing the tool 100 from going any further. In a preferred aspect, the track bar tool 100 is placed close to a driving wheel 42 of the roller tool 40. As discussed above, more than one track bar tool 100 may be necessary in order to reset the track 20. In such instances, this process is repeated until the needed number of track bar tools 100 are in place. For example, three track bar tools 100 can be utilized, with each track bar tool 100 being placed in adjacent gaps 34. In another aspect, three track bar tools 100 are utilized with the tabs 130 placed over adjacent treads 32, as shown in FIG. 20. In such aspects when multiple track bar tools 100 are utilized, it is preferable if one of the track bar tools 100 includes a tab brace 170 that is placed in the middle of the plurality of track bar tools.

After the track bar tools 100 are put in place (step 310), the track 20 can be advanced so that the track bar tools 100 engage the driving wheel(s) 42 (step 320). The advancement can be done by moving the tracks 20 in a forward or a backward direction. The track bar tools 100, and more specifically, the cylindrical body 120 of the bar 110, engages the exterior of the driving wheels 42 such that the teeth 26 of the track 10 are disengaged (i.e., not in contact) from the surfaces of the driving wheels 42. The number of track bar tools 100 necessary is determined by the size of the CTV 10, tracks 20, and driving wheels 42, but more importantly, the number of track bar tools 100 is determined by how many are necessary to fully disengage the teeth 26 of the tracks from the driving wheels 42.

After the track bar tools 100 have been advanced to disengage the teeth 26 from the driving wheels 42, force is applied to at least one of the track bar tools 100 to reset the track 20 on the wheels (step 400). More specifically, the force is applied to one of the track bar tools 100 until the teeth 26 of the tracks 20 are aligned with the inner channels/grooves 44 of the driving wheels 42. In an aspect, force can be applied by hitting the track bar tool 100 with a sledge hammer or some other force applying tool. In addition, as discussed above, the force is preferably applied to a track bar tool 100 that includes a tab brace 170. Force can be applied to all track bar tools 100, or only a portion of those used.

In most instances, when a track 20 is thrown from the roller tools 40, it is thrown from both the front and rear driving wheels. In such instances, steps 320 and 400 need to be repeated for the other driving wheel. Upon completion, the track 20 has been reset, and the track bar tools can be removed (step 500).

The methods discussed above can be applied to tracks 20 that have been thrown away from the machine side of the CTV 10 or thrown towards the machine side of the CTV 10. The track bar tools 100 are placed on the side of the tracks 20 that will need to have forced applied for realignment.

While the methods above have been discussed in relation to resetting the track 20 back in place, the track bar tools 100 can be used to remove the continuous tracks 20 from the CTV 10. The method includes preparing the track 20 to receive the track bar tool, placing the track bar tools 100 on the track, and applying force to the track bar tools 100.

First, the continuous track 20 of the CTV 10 is prepared to receive the track bar tools 100 by lifting the track 20 and the roller tool 40 off of the ground and the releasing/lessening the tension of the track 20. Next, the track bar tools 100 are placed on the track 20 in the manner as discussed above. However, in instances of removal, it is preferable to place the track bar tools 100 on the track 20 on the machine-side edge so that the force applied to the track bar tools 100 pulls/pushes the track 20 off of the roller tool 40.

After the track bar tools 100 are in place, the track 20 can be advanced so that the track bar tools 100 engage the driving wheel(s) 42. The advancement can be done by moving the tracks in forward or backward direction. The track bar tools 100, and more specifically, the cylindrical body 120 of the bar 110, engages the exterior of the driving wheels 42 such that the teeth 26 of the track 10 are disengaged (i.e., not in contact) from the driving wheels 42.

After the track bar tools 100 have disengaged the teeth 26 from the driving wheels 42, force is applied to at least one of the track bar tools 100 to remove the track 20 from the wheels 42. More specifically, the force is applied to one of the track bar tools 100 until the teeth 26 of the tracks 20 are clear of the edges of the wheels 42. In an aspect, force can be applied by hitting the track bar tool 100 with a sledge hammer or some other force applying tool, or by pulling on the track bar tools 100.

Having thus described exemplary embodiments of a method to produce metallic composite material, it should be noted by those skilled in the art that the within disclosures are exemplary only and that various other alternatives, adaptations, and modifications may be made within the scope of this disclosure. Accordingly, the invention is not limited to the specific embodiments as illustrated herein, but is only limited by the following claims.

What is claimed is:

1. A track bar tool for use to reset a thrown continuous track onto a wheel of a continuous track vehicle (CTV), the track bar tool configured to engage the thrown continuous track to reset track teeth of the continuous track within a channel on the wheel wherein the track bar tool comprises:
   a bar with a cylindrical body configured to engage the inside surface of the thrown continuous track and the outside of a wheel of the CTV, wherein the cylindrical body has a diameter greater than a height of the track teeth;
   a track mount tab connected to the cylindrical body, the track mount tab comprising an inner surface configured to engage the outer surface of the continuous track and an exterior surface; and
   a tab brace reinforcing the track mount tab wherein the tab brace is affixed to the exterior surface of the track mount tab and the tab brace is further configured to directly receive force.

2. The track bar tool of claim 1, wherein the track bar tool is configured to be received within a gap between adjacent treads of the thrown continuous track.

3. The track bar tool of claim 1, wherein the track bar tool is configured to be placed over a tread of the thrown continuous track.

4. The track bar tool of claim 1, further comprising two additional track bar tools, each additional track bar tool comprising a cylindrical body having a diameter greater than the height of the track teeth and a track tab mount connected to the cylindrical body and configured to engage the outer surface of the continuous track and wherein the cylindrical bodies of the track bar tool and of the two additional track bar tools are configured to be placed in three adjacent gaps on the inside surface of the thrown continuous track.

5. The track bar tool of claim 1, further comprising two additional track bar tools, each additional track bar tool comprising a cylindrical body having a diameter greater than the height of the track teeth and a track tab mount connected to the cylindrical body and configured to engage the outer surface of the continuous track and wherein the track tab mounts of the track bar tool and of the two additional track bar tools are configured to be placed over three adjacent treads.

6. The track bar tool of claim 1, wherein the tab brace comprises a notch configured to receive and be connected to the bar and the track mount tab.

7. The track bar tool of claim 1, wherein the tab brace reinforces a vertical portion of the track mount tab.

8. The track bar tool of claim 7, wherein the tab brace further reinforces a horizontal portion of the track mount tab.

9. A method of resetting a thrown continuous track onto a wheel of a continuous track vehicle (CTV), the method comprising:
   a. providing a track bar tool, the track bar tool comprising:
      i. a bar with a cylindrical body, wherein the cylindrical body has a diameter greater than the height of track teeth;
      ii. a track mount tab connected to the cylindrical body and configured to engage an outer surface of the continuous track; and
      iii. a tab brace reinforcing the track mount tab and configured to receive force;
   b. placing the cylindrical body of the bar of the track bar tool between the track teeth of the continuous track at a position where the continuous track is not in contact with the wheel;
   c. rotating the continuous track so the track bar tool engages the wheel of the continuous track vehicle so that the track teeth of the continuous track do not touch the wheel;
   d. applying force to the track bar tool at the tab brace to move the continuous track until the track teeth of the continuous track are aligned with a channel of the wheel; and
   e. removing the cylindrical body of the track bar tool from between the track teeth of the continuous track, leaving the track teeth within the channel.

10. The method of claim 9, wherein the track mount tab of the track bar tool is placed within a gap between a first tread and a second tread of the continuous track.

11. The method of claim 9, wherein the cylindrical body of the track bar tool is configured to engage the inside surface of the thrown track and the wheel of the CTV and the track mount tab is further configured to engage the outer surface of the continuous track by being placed over a tread of the continuous track.

12. The method of claim 9, wherein placing the track bar tool further comprises placing the track mount tab over a tread and placing the cylindrical body between the teeth of the continuous track.

13. The method of claim 9, wherein applying force comprises:
   applying force to the track bar tool to move the continuous track until the teeth of the track are aligned with the channel of a front wheel;
   advancing the continuous track to perform step c for a back wheel; and
   applying the force to the track bar tool to move the continuous track until the teeth of the track are aligned with the channel of the back wheel.

14. The method of claim 9, further comprising lifting a track and roller assembly off of the ground and releasing the tension of the continuous track before placing the track bar tool in a gap of the continuous track.

15. A method of removing a continuous track from a wheel of a continuous track vehicle, the method comprising:
   a. preparing the continuous track to receive a track bar tool by lifting one end of the-continuous track vehicle and releasing tension from the continuous track, the track bar tool comprising:
      i. a bar with a cylindrical body having a diameter greater than a height of teeth of the continuous track;
      ii. a track mount tab attached to the cylindrical body and configured to engage an outer surface of the continuous track; and
      iii. a tab brace attached to the track mount tab and configured to receive force;
   b. placing the track bar tool on a machine-side edge of the continuous track at a position where the continuous track is not in contact with a wheel;
   c. rotating the continuous track so that the track bar tool disengages the track teeth from a channel of the wheel;
   d. applying force to the track bar tool at the tab brace to dislodge the continuous track from the continuous track vehicle; and
   e. removing the track bar tool from the continuous track.

* * * * *